United States Patent

[11] 3,572,749

| [72] | Inventors | Ming-Chih Yew<br>Utica;<br>John Robertson, Jr., Royal Oak, Mich. |
|---|---|---|
| [21] | Appl. No. | 779,784 |
| [22] | Filed | Nov. 29, 1968 |
| [45] | Patented | Mar. 30, 1971 |
| [73] | Assignee | General Motors Corporation<br>Detroit, Mich. |

[54] VEHICLE SUSPENSION WITH RETRACTABLE AUXILIARY OVERLOAD SPRING
4 Claims, 3 Drawing Figs.

[52] U.S. Cl. .................................................. 280/124, 267/34
[51] Int. Cl. .................................................. B60g 11/56
[50] Field of Search.......................................... 267/34; 280/124 (F)

[56] References Cited
UNITED STATES PATENTS

| 3,414,278 | 12/1968 | Schmid........................ | 267/34X |
| 2,989,301 | 6/1961 | Johannsen.................... | 267/34 |
| 2,921,781 | 1/1960 | Pemberton................... | 267/34 |

*Primary Examiner*—Philip Goodman
*Attorneys*—W. E. Finken and D. L. Ellis

ABSTRACT: A vehicle suspension system in which a flexible bladder disposed within a primary suspension coil spring is inflated into axial abutting contact with the sprung and unsprung masses and radial contact with the inner surfaces of the spring coils to provide auxiliary leveling during greater than normal load conditions, and including control means for retracting the bladder axially and radially sufficient to withdraw it from contact with the spring coils and one of the masses when auxiliary leveling is not required.

PATENTED MAR 30 1971

3,572,749

INVENTORS
Ming-Chih Yew, &
BY  John Robertson, Jr.

W. F. Wagner
ATTORNEY

VEHICLE SUSPENSION WITH RETRACTABLE AUXILIARY OVERLOAD SPRING

This invention relates to vehicle suspension of the type including an inflatable bladder auxiliary spring disposed within a primary coil spring.

An object of the invention is to provide an improved auxiliary spring for vehicle suspension which is constructed and arranged so that the spring rate of the primary spring is modified only under conditions of abnormal loading.

Another object is to provide a suspension of the type described in which the inflatable bladder is preformed to a relaxed condition in which the outer diameter is less than the inner diameter of the spring coils and the axial length is less than the distance between the sprung and unsprung mass at maximum compression displacement, so that physical contact with the spring and both masses occurs only when the bladder is in inflated condition.

The foregoing and other objects, advantages and features of the invention will become more readily apparent as reference is had to the accompanying specification and drawing wherein.

Figure 1:
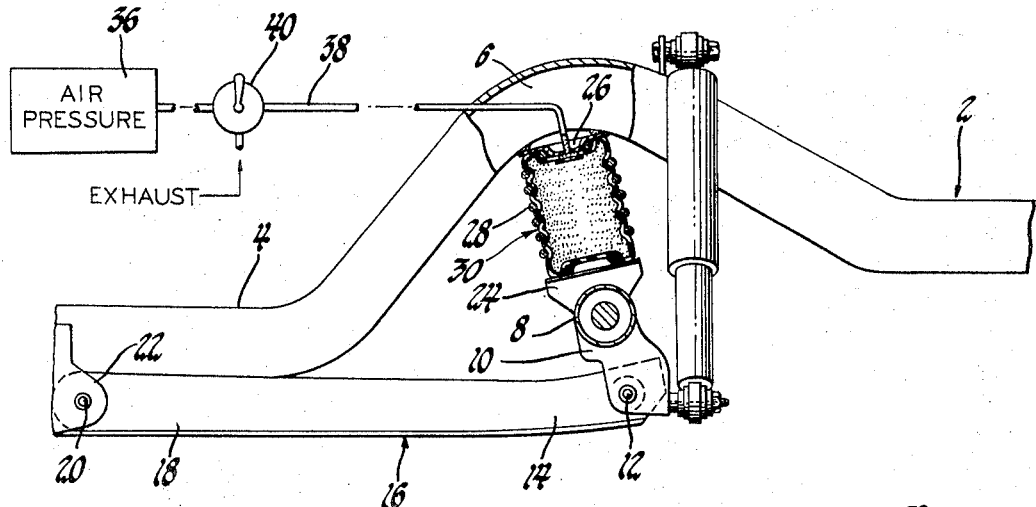
FIG. 1 is a partial side elevational view of a vehicle rear suspension system in accordance with the invention.

Referring now to the drawing and particularly FIG. 1, there is shown a portion of a vehicle in which the reference numeral 2 generally designates the frame portion of the vehicle sprung mass. Frame 2 includes a longitudinally extending side rail 4 having an upwardly arched portion 6 overlying a transversely directed wheel supporting axle housing 8. It will be understood that a side rail corresponding to rail 4 is disposed at the laterally opposite side of the vehicle similarly overlying axle 8 and that all subsequently described suspension structure related to one side of the vehicle is identical to that existing on the opposite side. Formed on and depending from axle housing 8 is a bracket 10 to which is pivotally connected at 12 the rearward end 14 of a longitudinally extending suspension control arm 16. The forward end 18 of arm 16 in turn is pivotally connected at 20 to a depending bracket 22 secured to side rail 4. Disposed in compression between lower spring seat 24 on axle 8 and upper spring seat 26 on arched portion 6 is a coil spring 28. Spring 28 is dimensioned and calibrated so as to provide a level attitude for the vehicle sprung mass when the latter is supporting a predetermined normal load complement of passengers, fuel and cargo.

As is well-known, whenever the load complement on the sprung mass is excessive or concentrated primarily at the rear of the vehicle, the rear suspension springs compress significantly causing the vehicle to exhibit a pronounced downward and rearward inclination. In the past, various proposals have been advanced involving utilization of so-called auxiliary springs which are brought into play to augment the primary suspension springs under conditions of abnormal load. One rather commonly utilized device involves disposition of an inflatable flexible bladder within the space circumscribed by coil type suspension springs. Upon introduction of excess load, the bladder is charged with superatmospheric air until the combined rate of the inflated bladder and the coil spring is sufficient to restore the sprung mass to a level attitude. While this expedient has proved reasonably effective, operation of the vehicle under normal load conditions may produce problems in terms of abrasion of the bladder or puncturing thereof due to physical contact with the continually expanding and contracting coils of the spring resulting from normal suspension deflection. In addition, even absent such destructive potential, constructions of the type described possess the additional undesirable quality of producing a significant modification of the normal rate characteristic of the coil spring during periods in which auxiliary leveling is not required. Thus, even when the bladder is not inflated, the pressure therein, although reduced to atmospheric, nonetheless rapidly rises to superatmospheric upon compression deflection of the coil spring and, therefore, adds unwanted rate under normal operating conditions.

Figure 3:
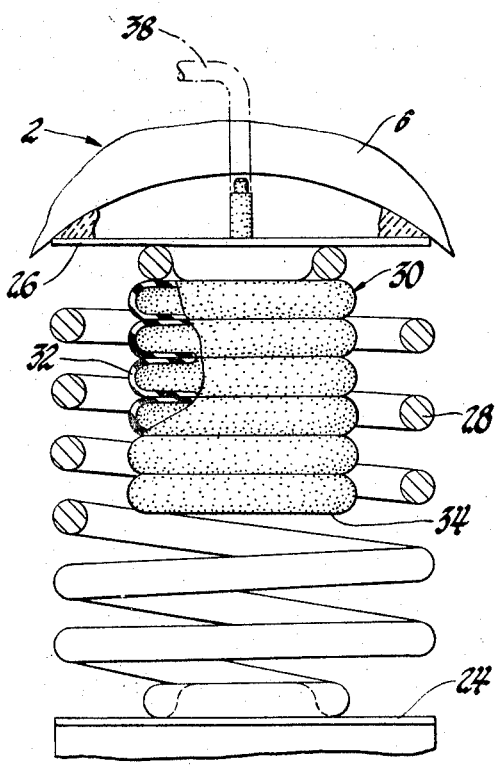
FIG. 3 is a view similar to FIG. 2 showing the vehicle under normal load conditions with the auxiliary spring in the normal retracted condition.
Figure 2:
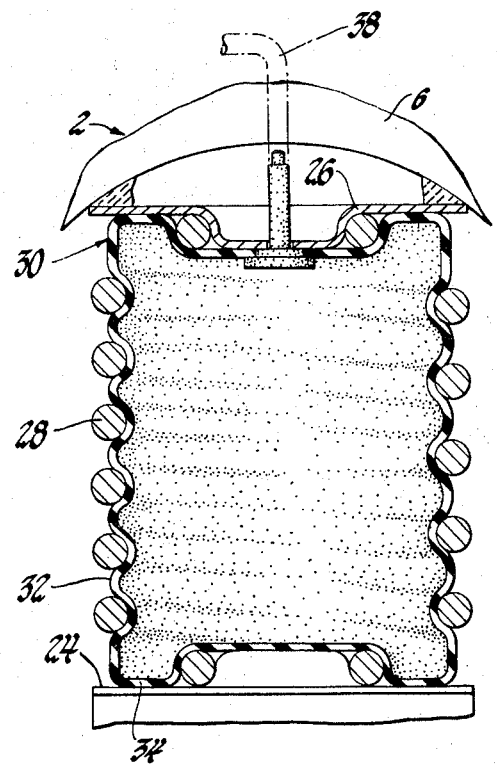
FIG. 2 is a greatly enlarged view of a portion of FIG. 1 showing the vehicle under abnormal load conditions and with the auxiliary spring inflated to a condition providing auxiliary load support.

To overcome the foregoing problems in accordance with the present invention, a bladder 30 is disposed within the coil spring 28 and is mounted permanently on the spring seat 26. As will be seen in FIG. 2, a bladder according to the present invention is molded to provide a collapsed preform configuration in which the accordionlike cylindrical outer wall 32 is retracted significantly from the inner surfaces of the spring coils while the closed lower end 34 is retracted a distance vertically above the lower spring seat 24 approximately equal to the normal maximum compression position thereof. Thus, under normal vehicle operation at normal load, deflection excursion of the lower spring seat 24 and coil spring 28 occasions no physical contact with the bladder. However, as seen in FIG. 2, when an increase in vehicle load occurs sufficient to require auxiliary leveling, the interior of bladder 30 is inflated from a source of superatmospheric pressure 36 via conduit 38 causing the bladder to expand both radially and axially as the accordian-type pleating unfolds. It will be understood that to control such communication between the source 36 and bladder 30, any well-known manual or height sensing valve mechanism 40 may be interposed in conduit 38. Upon reaching radial contact with the spring coils and abutting contact with the lower spring seat 24, the bladder functions thereafter in the normal manner providing a pneumatic auxiliary spring augmenting the supporting capabilities of coil spring 28. Conversely, as soon as the overload is removed, exhausting the interior of bladder 30 to atmosphere permits the bladder to return to the normal retracted position shown in FIG. 3 as an incidence of elastic memory of the accordionlike wall portions thereof. As a result, risk of abrasion, pinching and other destructive effects, under normal load operating conditions is totally eliminated. Additionally, due to its retracted condition under normal load conditions, the bladder 30 does not adversely influence the normal spring rate of coil spring 28.

While but one embodiment of the invention has been shown and described, it will be apparent that other changes and modifications may be made therein. It is, therefore, to be understood that it is not intended to limit the invention to the embodiment shown.

We claim:

1. In a motor vehicle having a sprung and an unsprung mass, a composite spring assembly comprising a coil spring disposed in compression between said sprung and unsprung mass, a flexible walled container disposed interiorly of said coil spring, means for inflating said container to an expanded condition engaging said coil spring and said masses providing auxiliary elastic force acting in parallel relation with said coil spring, and means responsive to deflation of said container for contracting the same so that the flexible wall thereof is withdrawn from contact with said coil spring and one of said masses.

2. In a motor vehicle, a sprung mass having an upper spring seat formed thereon, an unsprung mass having a lower spring seat formed thereon, a coil spring disposed in compression between said seats, an elastomeric bladder mounted on one of said spring seats interiorly of said coil spring, said bladder including a preformed generally cylindrical wall which in relaxed condition retracts radially and axially to dimensions providing radial clearance with the coils of said spring and axial clearance with the other of said spring seats, and means for inflating said bladder to displace the same into radial engagement with said spring coils and axial abutting engagement with said other spring seat to provide a pneumatic spring for augmenting the elastic force of said coil spring.

3. The invention of claim 2 wherein the cylindrical wall in relaxed condition defines accordion pleats of generally curved cross section.

4. The invention of claim 3 wherein said bladder is mounted on the upper spring seat.